United States Patent [19]

Myatt et al.

[11] Patent Number: 5,231,569
[45] Date of Patent: Jul. 27, 1993

[54] ACCOUNT TRANSACTION SYSTEM

[75] Inventors: Larry H. Myatt, Libertyville; Bruce C. Rhoads, Wheaton, both of Ill.

[73] Assignee: Sears Payment Systems, Inc., Riverwoods, Ill.

[21] Appl. No.: 537,082

[22] Filed: Jun. 12, 1990

[51] Int. Cl.⁵ .......................... G06K 5/00; G06F 15/21
[52] U.S. Cl. ...................................... 364/408; 235/381; 235/379
[58] Field of Search ............... 364/401, 402, 408, 405, 364/406; 235/379, 380, 382.5, 375

[56] References Cited

U.S. PATENT DOCUMENTS

| | | | |
|---|---|---|---|
| 4,491,725 | 1/1985 | Pritchard | 235/375 |
| 4,727,243 | 2/1988 | Saver | 235/379 |
| 4,734,564 | 3/1988 | Boston et al. | 235/380 |
| 4,812,628 | 3/1987 | Boston et al. | 235/380 |
| 4,822,985 | 4/1989 | Boggan et al. | 235/380 |
| 4,858,121 | 8/1989 | Barber et al. | 364/406 |
| 4,868,900 | 9/1989 | McGuire | 235/380 |
| 4,870,259 | 9/1989 | Boggan et al. | 235/380 |
| 4,891,503 | 2/1990 | Jewel | 235/380 |
| 4,908,521 | 3/1990 | Boggan et al. | 235/380 |
| 4,943,707 | 7/1990 | Boggan | 235/380 |
| 4,975,840 | 12/1990 | DeTore et al. | 364/401 |
| 5,025,138 | 6/1991 | Cuervo | 235/379 |
| 5,070,452 | 12/1991 | Doyle, Jr. et al. | 364/401 |

Primary Examiner—Roy N. Envall, Jr.
Assistant Examiner—A. Bodendorf
Attorney, Agent, or Firm—Willian Brinks Olds Hofer Gilson & Lione

[57] ABSTRACT

A system for performing transaction from an account such as a checking account which adds a measure of assurance of payment to the account issuer is provided. The system includes a remote transaction terminal located at the point of the transaction. The terminal reads data on a card which identifies the card holder. The amount and type of the transaction are inputted into the transaction terminal. A transaction processor is provided which accesses two negative data files. One of the negative data files is compiled by the account issuer and the other of the negative data files is compiled by a number of account issuers such as by a number of different merchants. The data identifying the card holder is compared to the data in both of the negative files and an authorization or denial signal is generated in response to the comparison.

10 Claims, 2 Drawing Sheets

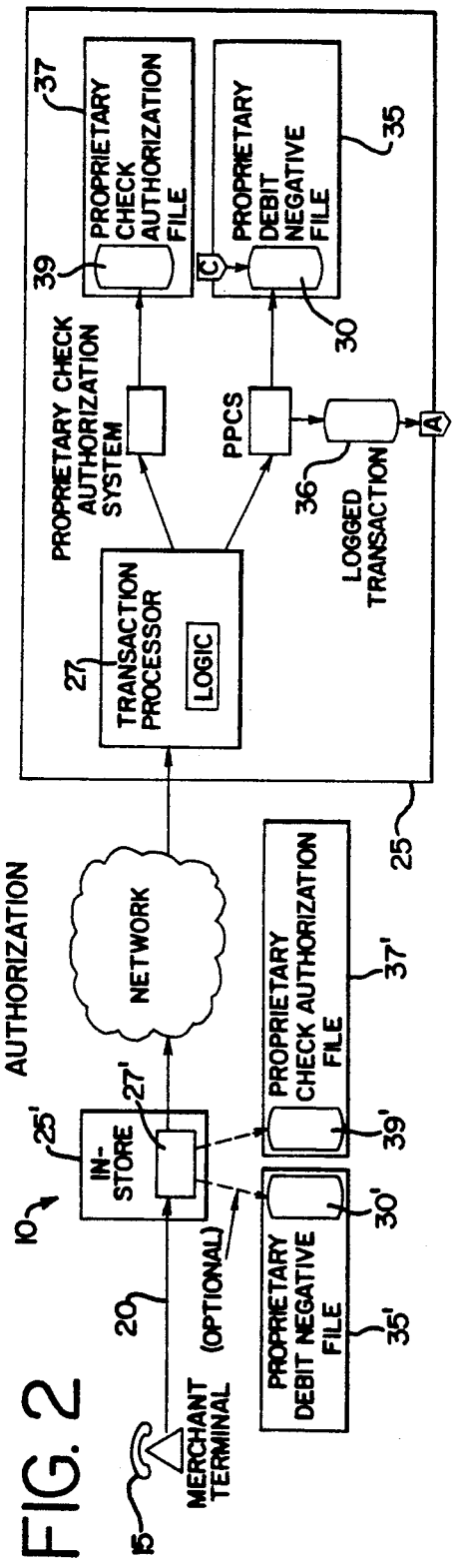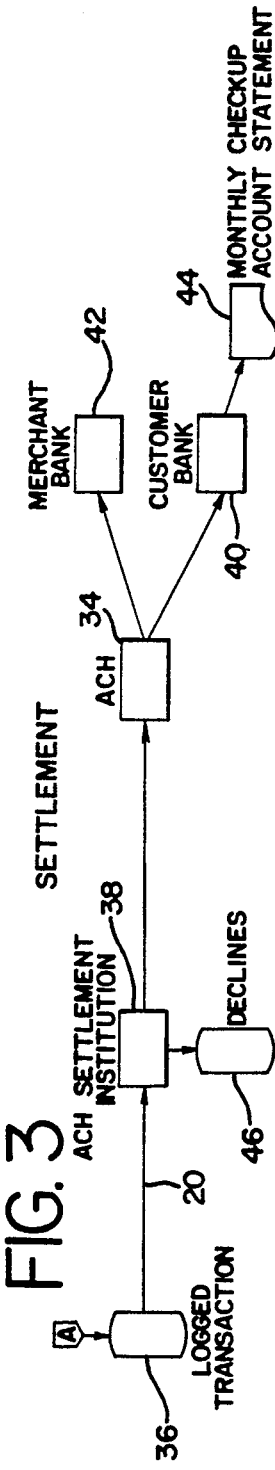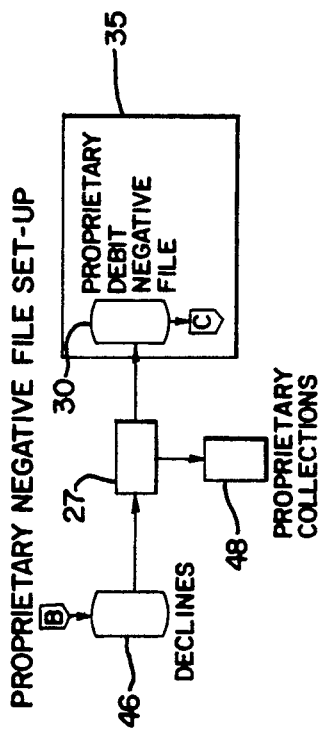

ACCOUNT TRANSACTION SYSTEM

BACKGROUND OF THE INVENTION

The present invention relates generally to a computer payment system and more specifically to an account transaction system which is used for performing a payment transaction from an account.

Several systems are presently available with which a person may use an interactive computer-aided payment system. Several of these systems involve credit card payment systems. In these types of systems usually the computer systems credit the retailer or merchant where the transaction card is used and the payment is logged against the transaction card holder's file and later billed to the transaction card holder.

In other systems the card holder will fund an account which is debited for the amount of the transaction directly such as currently being utilized in the banking industry; where transaction cards enable common banking functions to be performed without a teller by using an automatic terminal. These type of transaction cards are known as "debit cards".

As the use of computer-aided transaction card systems has increased various automatic "on-line" authorization systems have developed. In these systems transaction information identifying the card holder and information regarding the transaction itself is usually transmitted via a communications network to an authorization center for approval, denial or further routing.

Typically, in a credit card payment system, these authorization centers determine whether a transaction will be approved or denied by comparing the transaction information against a set of various parameters supplied by the transaction card issuer to the authorization center. These parameters detail the transaction card holder's records. Typically these records include information regarding any limitations on the amount.

Typically, in a debit card payment system these authorization centers determine whether a transaction will be approved or denied by comparing the transaction information against the individual account issuers's files of account users to determine if funds are available to complete the transaction.

Employing either of these types of authorization systems may require searching the complete file of all the card holders of a card issuer or the authorization center may directly access a user's account file through an account number or code assigned to the account user. This often results in relatively long response times, typically the response time is between 20 and 40 seconds per account transaction, when approving or denying a transaction. Longer response times result in higher communication costs and longer delays in completing a transaction and are therefore undesirable.

In addition, typically in a credit card payment system when a card holder uses his or her transaction card in a retail place of business, the card issuer is directly responsible for payment to the retailer or merchant of the card holder bill. The card issuer must then bill the card user on a periodic basis for reimbursement. Between the time the card holders transaction is approved and the time the card holder is billed by the card issuer, the card holder may become insolvent or unable or unwilling to reimburse the card issuer thereby resulting in collection problems for the transaction.

In view of these disadvantages of existing account transaction systems, it would be desirable to provide a system where the authorization time of a transaction is reduced. Such a system would reduce communication costs and thereby reduce delays in completing a transaction. It would also be desirable to provide a system where the risk of non-payment to the card issuer from the card holder is substantially reduced.

Therefore in view of the above, it is an object of the present invention to provide a new and improved transaction authorization and payment system wherein the interactive time delay before a transaction is approved or denied is reduced.

It is another object of the present invention to provide a new and improved authorization and payment system wherein issuers of cards can easily and repeatedly update the information on which an approval or denial of a transaction is based.

It is another object of the present invention to provide a new and improved authorization and payment system wherein the present invention provides the card issuer with an additional degree protection from authorizing a transaction when there is a substantial risk of non-payment from the cardholder for the amount of the transaction.

It is a further object of the present invention to provide a new and improved authorization and payment system wherein the risk to the card issuer of nonpayment from the card holder for the amount of a transaction is minimized.

It is a further object of the present invention allowing the account issuer to maintain transactions and payment information regarding cardholder accounts for marketing and control reasons.

SUMMARY OF THE INVENTION

In accordance with these and other objects, the present invention provides for an account transaction system for performing a transaction from a checking account, or other type of money account, of an account holder and which reduces the authorization time and communication expense of a transaction.

In accordance with the present invention the account transaction system may include a transaction card having a means for carrying data identifying the account holder. The information placed on the transaction card is received by a remote transaction terminal located at the point of the transaction. The remote transaction terminal or point-of-sale terminal includes a means for reading the data carried on the transaction card and a means for inputting and communicating a unit of information defined as the transaction information. This transaction information includes input data identifying a type, of transaction, and the amount of the transaction. Further the transaction information includes data carried on the transaction card identifying the account user. The transaction terminal communicates the transaction information to a transaction processor over a communication network. The transaction processor may be located at the point-of-sale or located at any account issuer's facility remote from the point-of the transaction. A first database in a memory is provided which includes negative information which identifies account holders that present an unacceptable risk of non-payment to an account issuer. The first database is compiled from the issuer's files. The transaction processor receives the transaction information and is operatively connected to access the database in the memory. The transaction processor is further operatively connected to access a second database in a memory which includes a compilation of negative information from a plurality of sources which identifies card users that present an unacceptable risk of non-payment.

The transaction processor includes a program that further includes logic which generates an authorization signal after the program has compared the transaction information received from the transaction terminal with the negative information in the first database of the memory and with the second database of memory. The signal indicating authorization or denial of the transaction is communicated to the transaction terminal over the communication network.

In a preferred embodiment of the invention, the account transaction system is used to perform a transaction from an account of the user. In this embodiment, the account transaction system may include a money access account means having a processor including a logic means for processing authorized transactions of the user. The money access account has a preestablished source of funds, such as a checking account. In this embodiment, the program of the transaction processor includes a logic means for accessing the money access account and for debiting from that money access account the amount of an authorized transaction.

In another embodiment of the present invention the transaction processor includes a logic means for accessing an automatic clearing house institution having a means for accessing the money access account of an account user, and for debiting from that money access account the amount of an authorized transaction.

Additional objects, advantages and novel features of the invention will be set forth in part in the description which follows, and in part will become apparent to those skilled in the art upon examination of the following. The objects and advantages of the invention may be obtained by means of the combinations particularly pointed in the appended claims.

BRIEF DESCRIPTION OF THE DRAWINGS

FIG. 2 is a flow chart illustrating a preferred embodiment of the account transaction system of the present invention.

FIG. 3 is a flow chart illustrating a preferred embodiment of the logic for settlement of a transaction.

FIG. 4 is a flow chart illustrating a preferred embodiment of the logic of the account transaction system for identifying transaction card holders that present a unacceptable risk to the card issuer of non-payment.

DETAILED DESCRIPTION OF THE PREFERRED EMBODIMENTS

Figure 1:
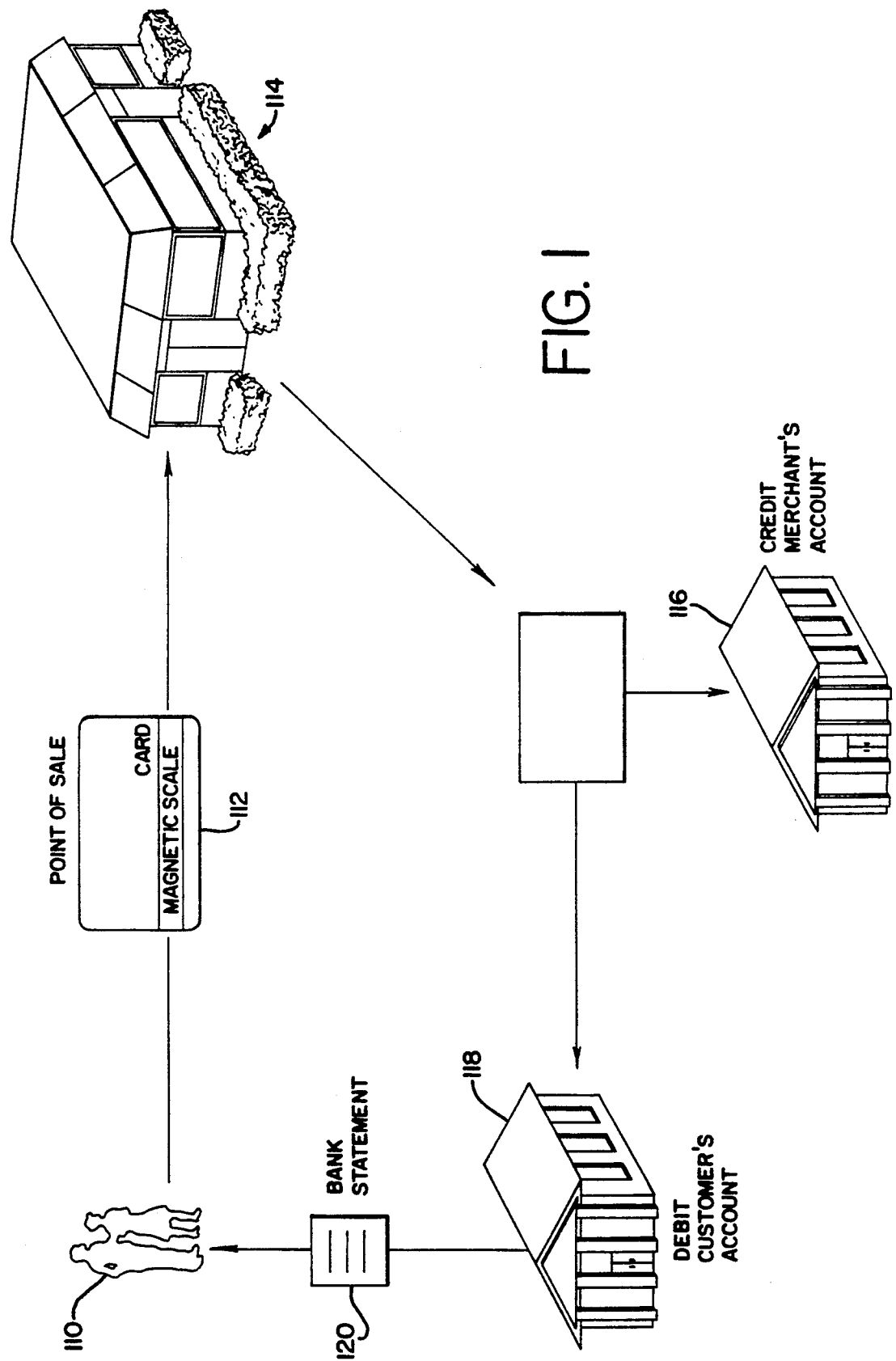
FIG. 1 is schematic diagram illustrating how the account transaction system of the present system is used by a transaction card holder.

Referring now to the drawings and specifically to FIG. 1, a schematic representation of how the account transaction system may be operated is shown. The account users 110 obtain a transaction card 112 from an account issuer, which may be for example a fast food restaurant, supermarket, or gasoline retailer. The account issuer may also be for example, a bank or credit card company. The transaction card 112 is then used to purchase goods or services at an account issuer's place of business 114. The account transaction system then processes the transaction as described in more detail below. The account transaction system credits to the account issuer the amount of the transaction. Typically, the merchant's account is credited to the bank 116. The account transaction system also debits from an account users money access account the amount of the transaction. Typically the money access account of the user is debited at the user's bank 118. This debit is recorded in a periodic statement to the account user 110. Typically this debit is recorded in the account user's monthly statement 120.

Referring now specifically to FIG. 2, the account transaction system of the present invention is designated generally by reference numeral 10. For purposes of illustration, portions of the description which follow are directed to an account transaction system for use by a merchant or retailer and their customers. It will be recognized by those skilled in the art, however, that the invention is not limited to use by merchants and retailers, or their customers, and contemplates other transactions.

The account transaction system 10 includes a transaction card 112 (FIG. 1) having a means for carrying data identifying an account transaction system user and data supplied by an account transaction system issuer. In this system, a merchant, retailer, or other organization is denoted hereinafter as an account issuer. The account issuer distributes the transaction cards to a number of customers, denoted hereinafter as account users or account holders.

Optionally, at the request of the account user, the account issuer will typically collect information from the account user to make an evaluation and assign a monetary limit or transaction number limit to the account user. This information along with information identifying the account user may be carried on the transaction card 112 (FIG. 1). Typically this information may be stored in a suitable memory 25 accessed by a transaction processor 27. This memory 25 may be located in a central location of the account issuer remote from the point of sale, for instance, in a mainframe computer of the transaction system. Alternatively, the memory 25 may be located at the account issuer's place of business of location 114 (FIG. 1) for savings of communication costs, and speed of transaction purposes.

The information carried on the transaction card is preferably encoded onto a magnetic stripe that may be included on the transaction card. Such magnetic stripes are well known in the art and therefore no further description is given here. As will be appreciated, transaction cards are being developed which do not utilize a magnetic stripe to store cardholder information. For example, various "smart cards" have been developed where the information is held in a computer memory in a card. The present invention is intended to cover these types of transaction cards and any other where the information identifying the account transaction user and the information supplied by the account issuer is placed on the card in a manner to be readable by a transaction terminal.

In the preferred embodiment of the present invention, the account issuer is connected via communication lines 20 to a plurality of transaction terminals 15. These transaction terminals are typically located at merchant locations where sales or services are being sought. However, the transaction terminals may be located elsewhere.

At the time of a purchase or other transaction, an account user inserts the transaction card in a transaction terminal located at the place of the transaction. In FIG. 2, the transaction terminal is represented as a merchant's terminal 15 for purposes of illustration. The transaction terminal 15 includes a means for reading the data carried on the transaction card. Further, the transaction terminal 15 includes a means for inputting and recording information including the type of transaction, and the amount of the transaction. A unit of information denoted hereinafter as transaction information is comprised from the information read from the transaction card and the information inputted at the transaction terminal. Such means for inputting the information is known in the art.

The transaction information is then communicated over a communications network to a transaction processor 27 along with an authorization request signal.

As illustrated in FIG. 2, the transaction processor 27 may be located in an account user's of processor's mainframe facility. Alternatively, as illustrated in FIG. 2, the transaction processor may be located as an in-store device of the account issuer, as illustrated in FIG. 2, numeral 27'.

In the preferred embodiment of the present invention the transaction processor 27 is operatively connected in a manner known in the art to receive the transaction information and access data or information from a database 35 in a memory. As illustrated in FIG. 2 the proprietary debit negative file 30 is included in a first database 35. The proprietary debit negative file 30 comprises negative information that identifies for the account issuer those account users who present an unacceptable risk of non-payment to the account issuer for an account transaction. The data in the proprietary debit negative file 30 is compiled in the usual manner from the merchant's own files.

Further, the transaction processor 27 is operatively connected in a manner known in the art to access data or information from a second database 37 in a memory. As illustrated in FIG. 2 as the proprietary check authorization file 39 is included in the database 37 in a memory and comprises a compilation of negative information from a plurality of sources that identifies for the account issuer those account users who present an unacceptable risk of non-payment to the account issuer. For example, the data may be compiled from a number of merchants who have agreed to provide a single central service which will compile such data.

The particular criteria for determining those account users that present an unacceptable risk of non payment to the account issuer and therefor are compiled in the negative file 30 of the database 35 is determined by various parameters as customized by the account issuer. For example these parameters may include but are not limited to an account user's past history of payments or information regarding transaction cards that have been lost or stolen from the particular account user.

The criteria for determining those account users that present an unacceptable risk of non-payment and therefor are compiled in the authorization file 39 is determined by collecting information from a plurality of merchants, account issuers or other credit history networks. These sources compile a generic file of credit history networks on account users that present an unacceptable risk of non-payment.

Means are provided for quickly and repeatedly updating or revising the data in the negative file 30 and the authorization file 39. Such information may be, for example, updated daily to provide a current listing of negative file data.

In response to the authorization request signal from the remote terminal, the transaction processor's 27 logic means accesses the first negative file 30 in the database 35 and the second negative file 39 (illustrated in FIG. 2 as the authorization file 39) in the database 37. The processor 27 then compares the transaction information received from the transaction terminal with the negative information stored in the database 35 and the negative information stored in the database 37. The transaction processor's 27 logic means then generates an authorization signal directly dependant on the results of the comparison of transaction information and the negative information of the database 35 and the negative information of the database 37. The authorization signal may be either an approving signal or a denying signal. If the account user's transaction information matches with either the negative information accessed in the negative file 30 in the database 35 or the negative information accessed in the authorization file 39 in the database 37 for the same account user, the transaction processor is programmed to generate a signal denying the account transaction. If however, the transaction processor's logic means does not match the account user's transaction information with any of the negative information accessed in either the database 35 or the database 37 for the same account user, the transaction processor is programmed to generate a signal approving the transaction.

The authorization signal is then communicated over a communication network 20 to the transaction terminal 15. The transaction processor 27 upon generating an authorization signal preferably records the transaction information as a logged transaction 32. Optionally, the transaction processor, negative file and authorization file may be located regionally at various places of business of an account issuer. As illustrated in FIG. 2, a transaction processor 27' accesses both the negative file 30' of the database 35' and the authorization file 39' of the database 37'. An authorization signal is generated in the same method as discussed in the previous embodiment.

Referring now to FIG. 3, in a preferred embodiment of the present invention the transaction processor includes a logic means 34 for accessing a money access account means that includes a processor and logic means 34. Typically this money access account means and processor is located at an automatic clearing house (ACH) 38. A logged transaction 36 is communicated to an automatic clearing house network (ACH) 38.

A logged transaction or as usually performed, a batch of logged transactions are communicated from the automatic clearing house 38 via a communications network 20 to the money access account means processor 34. The money access account processor includes a logic means for accessing a money access account. For purposes of example, a money access account may be an account checking account located at the account user's bank 40. The money access account means of the present invention thus has an account which functions as source of funds. The account is preferably preestablished at the time an account user is issued a transaction card.

Further, the money access account processor includes a logic means for processing an approved logged transaction involving the account user's money access account, for example a checking account located at an account user's bank 40.

Optionally, when this account is accessed, the logic means of the money access account processor 34 of the ACH 38 debits from the money access account the amount of the transaction.

Preferably, the amount of the transaction is then credited to an account issuer's bank account at the account issuer's bank 42. The account issuer's bank is denoted as a merchant 42 in FIG. 3 for purposes of illustration. Means of crediting the amount of an approved transaction in an account issuer's bank account are known in the art.

Preferably, the amount debited from the account user's money access account is recorded in a periodic statement. Typically, the amount debited is recorded in the account user's monthly bank account 44.

If the money access account processor is unable to debit the money access account of a user due to, for example, insufficient funds, for a logged transaction 36 that was authorized the money access account processor rejects transaction. (Illustrated as Declines 46 in FIGS. 3 and 4). These rejected logged transactions then goes back to the transaction processor 27 where they are recorded as a rejection, and are then entered onto the first negative file 30.

Optionally logged transactions received from the transaction processor 27 which indicate a transaction was denied are also recorded as a decline 46. Preferably, all declines are then imputted into the negative file 30 compiled in the database 35 in a memory. Preferably, the negative file 30 is repeatedly updated to include logged transactions that are recorded as declines. Optionally, declines that have been recorded because the money access account processor was unable to debit the money access account are submitted to an account issuer's collection's department or other Proprietary Collection Agency 48 for recovery of outstanding transaction amount from an account user.

Other limitations may be established by the account issuer or requested optionally by an account user. For example, the issuer may include an upper limit on the number of transactions that a user may perform in a predetermined time period or optionally a user may request such a limit. For example, a card may have a limit of three transactions per day. After three transactions are performed, the account is placed in a local negative file. Alternatively, an upper limit could be placed on the amount permitted to be transacted during a predetermined time period. For example, a $10.00 per day upper limit may be placed on the account. After an account user has transacted that amount in the predetermined time period, the account is placed in a regional negative file.

The account transaction system of the present invention provides several significant advantages over the prior art systems. By searching only through negative files, the interactive time for approving or denying a transaction is substantially reduced.

In addition, the issuer is provided extra protection against the unacceptable risk of non-payment because the system of the present invention searches an individual account issuer's database comprising negative information of account users and further searches a comprehensive database compiled of negative information of account users compiled from various sources in addition to the account issuer's database of negative information.

The negative file and authorization file can be easily and repeatedly updated or revised to keep the user data current.

Further, since the files are compiled by the issuer instead of by a bank as is typically done, the issuer can access the transaction and payment information regarding the cardholder accounts for marketing and control purposes. This type of information may be particularly useful in determining buying trends of certain users etc.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and various embodiments and with various modifications as are suited to the particular use contemplated. It is intended that the scope of the invention be defined by the following claims, including all equivalents.

We claim:

1. An account transaction system for performing a transaction at a transaction point from an account issued by an account issuer to an account holder, said system servicing a plurality of account issuers, said system comprising:

a transaction card carrying account holder data identifying the account holder;

a remote transaction terminal located at the transaction point, said terminal having means for reading the account holder data carried on said card, and a means for inputting transaction terminal information, said transaction terminal information identifying a type of transaction, and an amount for said transaction, such that a unit of transaction information data is generated by combination of the account holder data and the transaction terminal information, said remote transaction terminal having means for generating an authorization request signal for said transaction information data;

memory means including a first database having a first set of negative data of a plurality of account holders identifying account holders that present an unacceptable risk of non-payment to account issuer, said first database compiled from data only from said account issuer, and a second database having a second set of negative data of a plurality of account holders identifying account holders that present on unacceptable risk of non-payment to account issuer, said second set of negative data compiled from data from said plurality of account issuers;

an authorization processor operatively connected to receive said authorization request signal from said remote transaction terminal, said authorization processor including a logic means for: a) comparing said transaction information data for said account holder to said data in said first and second sets of negative data; b) generating an authorization response signal, said response signal comprising one of a first signal and second signal, said first signal indicating authorization of an account transaction if there is no match between said transaction information data and both of said first and second sets of negative data and a second signal indicating non-authorization of said transaction if there is a match between said transaction information and said first set or said second set of negative data, said authorization processor operatively connected to transmit said responsive signal to said remote transaction terminal.

2. An account transaction system for performing a transaction at a transaction point from an account issued by an account issuer to an account holder, said system being operatively connected to be accessible by a plurality of account issuers, said system comprising:

a transaction card carrying account holder data identifying an account holder;

means for entering and storing in a first database a first set of negative file data identifying account holders that present an unacceptable risk of non-payment to account issuer, said first set of data compiled from data only from said account issuer;

memory means including a second independent database having a second set of negative data of a plurality of account holders identifying account holders that present an unacceptable risk of non-payment to account issuer, said second set of negative data compiled from data from said plurality of account issuers;

a remote transaction terminal located at the point of the transaction, said terminal having
  (a) means for reading the account holder data carried on said card,
  (b) means for inputting and recording transaction terminal information said transaction terminal information, identifying a type of transaction, and an amount for said transaction,
  (c) means for generating a unit of transaction information data, said transaction information data combining said account holder data and said transaction terminal information, and
  (d) means for transmitting an authorization request signal;

an authorization processor operatively connected to receive said authorization request signal from said remote transaction terminal, said authorization processor including a logic means for: a) comparing said data for said account holder to said data in said first and second sets of negative data; b) generating an authorization response signal, said response signal comprising one of a first signal and second signal, said first signal indicating authorization of an account transaction if there is no match between said transaction information data and both of said first and second sets of negative data and a second signal indicating non-authorization of said transaction if there is a match between said transaction information data and said first set or said second set of data; and a means for communicating said response signal to said remote transaction terminal.

3. An account transactions system as defined in claim 2 wherein said transaction terminal further includes logic means for batching a plurality of authorized transactions occurring at said transaction terminal over a predetermined time period.

4. An account transaction system of claim 2 wherein said logic means of said authorization processor further includes a means for limiting to plurality of times determines by said account issuer the number of account transactions said authorization processor authorizes for the card holder over a time period determined by said account issuer.

5. An account system as claimed in claim 2 wherein said transaction card includes a magnetic stripe containing account holder data identifying said card holder.

6. An account transaction system of claim 2 wherein said transaction terminal further includes a logic means for limiting to a plurality of times determined by said account issuer the number of account transactions said authorization processor authorizes for the card holder over a time period determined by said account issuer.

7. An account transaction system as defined in claim 1 wherein said transaction terminal further includes a logic means for batching a plurality of authorized transactions occurring at said transaction terminal over a predetermined time period.

8. An account transaction system of claim 1 wherein said logic means of said authorization processor further includes a means for limiting to plurality of times determined by said account issuer the number of account transactions said authorization processor authorizes for the card holder over a time period determined by said account issuer.

9. An account system as claimed in claim 1 wherein said transaction card includes a magnetic stripe containing account holder data identifying said card holder.

10. An account transaction system of claim 1 wherein said transaction terminal further includes a logic means for limiting to a plurality of times determined by said account issuer the number of account transactions said authorization processor authorizes for the card holder over a time period determined by said account issuer.

* * * * *